F. A. FALK & H. C. ANDERSON.
GANG PLOW.
APPLICATION FILED JULY 9, 1907.
900,919.
Patented Oct. 13, 1908.
3 SHEETS—SHEET 2.
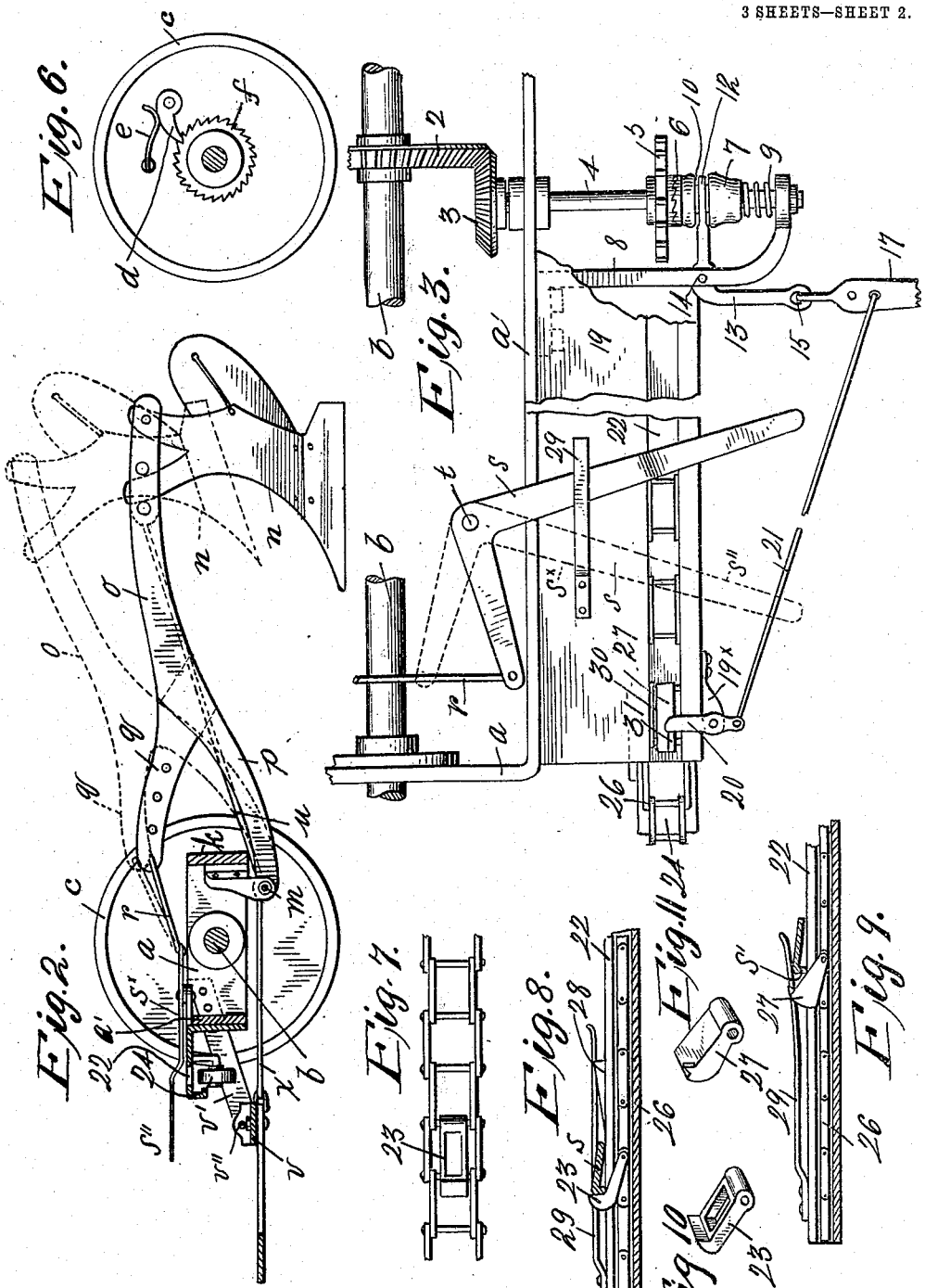
Witnesses:
Harry C Hebig
M. Hamilton.
Inventors:
Frank A. Falk
Henry C. Anderson
By their Attorney
James Hamilton

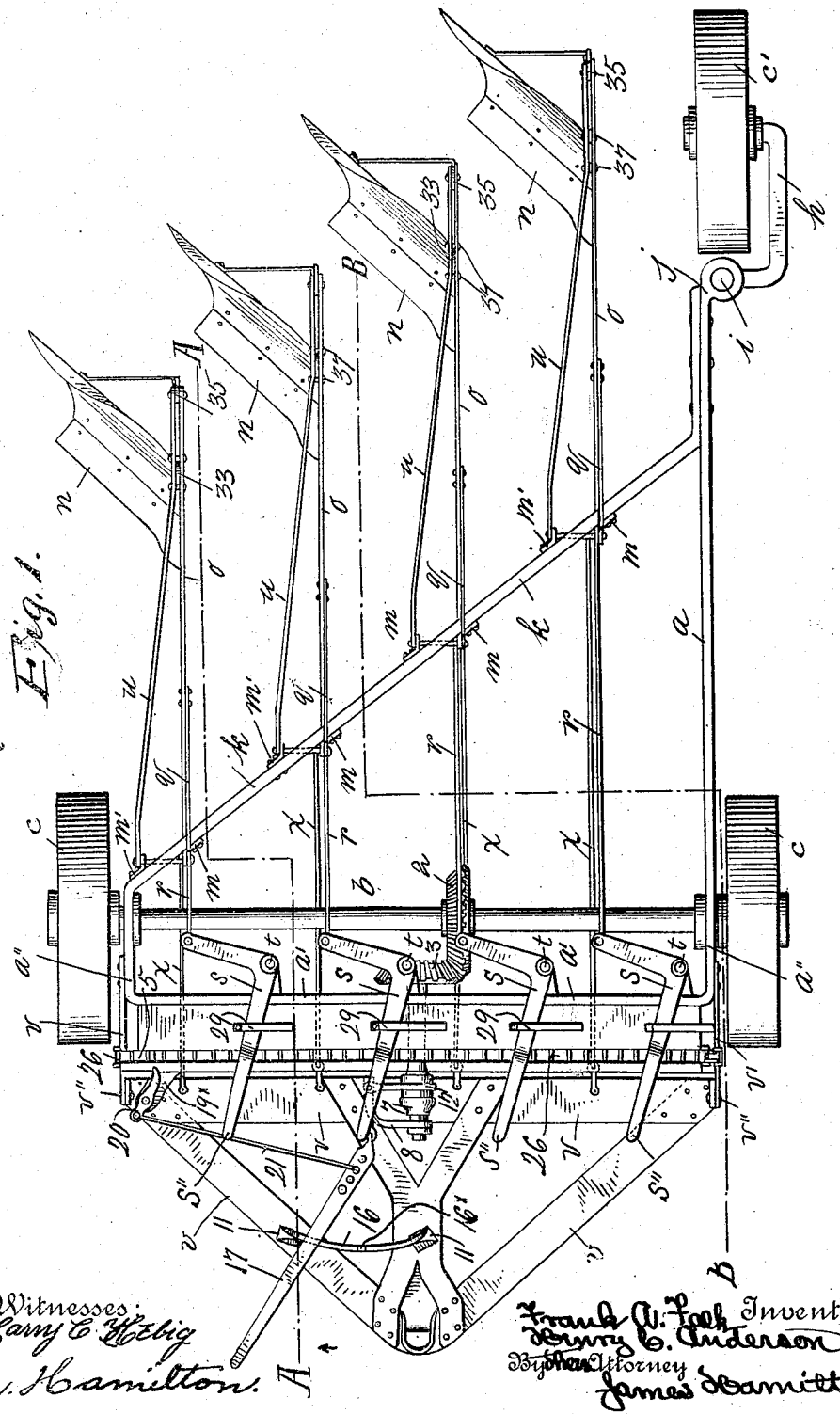

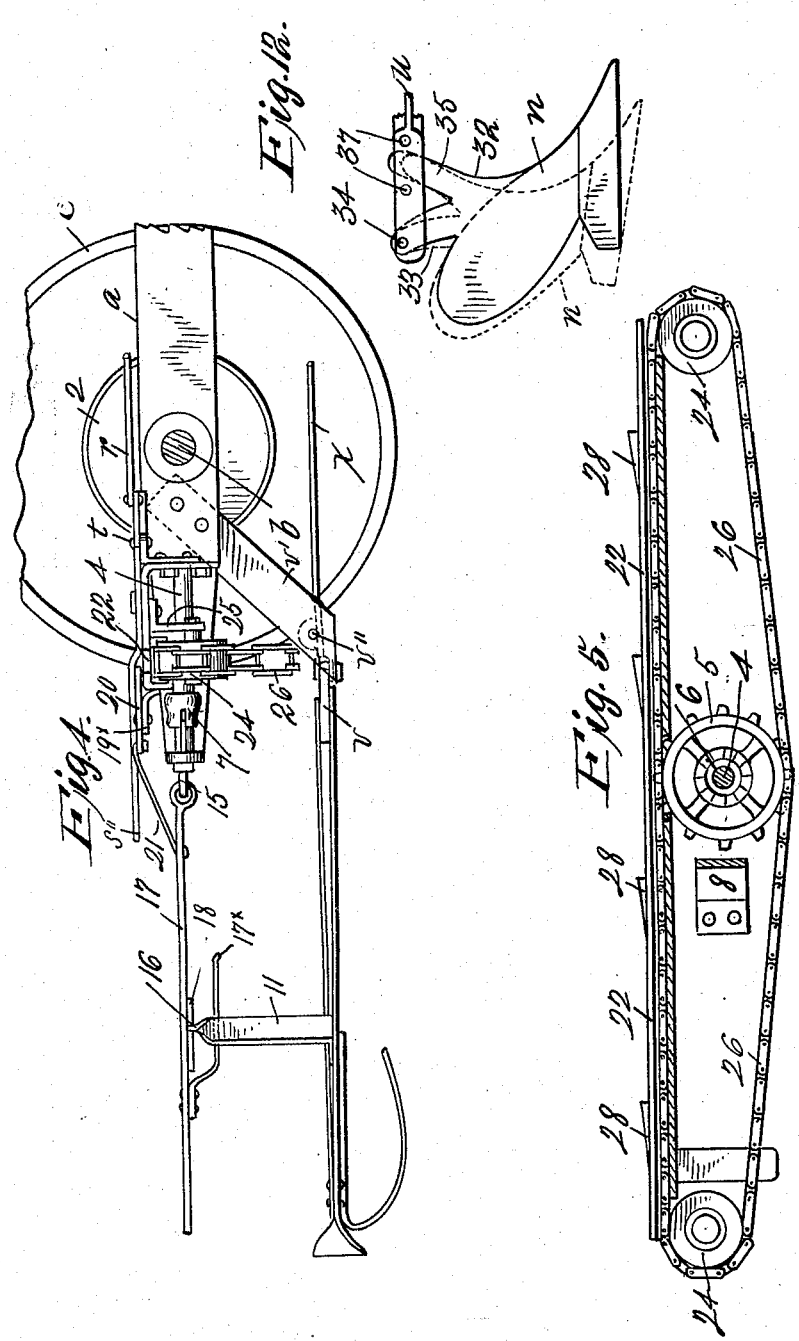

UNITED STATES PATENT OFFICE.

FRANK A. FALK AND HENRY C. ANDERSON, OF STACYVILLE, IOWA.

GANG-PLOW.

No. 900,919. Specification of Letters Patent. Patented Oct. 13, 1908.

Application filed July 9, 1907. Serial No. 382,938.

*To all whom it may concern:*

Be it known that we, FRANK A. FALK and HENRY C. ANDERSON, citizens of the United States, residing at Stacyville, in the county of Mitchell and State of Iowa, have invented certain new and useful Improvements in Gang-Plows, of which the following is a specification, reference being had to the accompanying drawings.
Our invention relates to improvements in gang plows; and one object of our invention is to provide a gang plow with means for raising in succession the several plows of the gang, in order that the end of each furrow will lie in the same straight line with the end of the adjacent furrows.

Further, in our new gang plow each plow of the gang is susceptible of being lowered to the ground successively, in order that all the furrows will begin on the same line. In this way provision is made for the cultivation of the total area, no part being left unturned at the ends of the field.

Another object of our invention is to provide a gang plow in which each plow of the gang is susceptible of operation independent of its fellows, whereby all or any number of the plows may be used.

In the drawings illustrating the principle of our invention and the best mode now known to us of applying that principle, Figure 1 is a plan view of our new gang plow; Fig. 2 is a section on line A—A, Fig. 1, showing in elevation one of the plows of the gang, together with its mode of attachment to the frame; Fig. 3 is a plan of a portion of the front of our new gang plow; Fig. 4 is a section on line B—B of Fig. 1, Fig. 5 is a sectional detail on the line C—C of Fig. 1;
Fig. 6 is a detail showing in elevation one of the front wheels and its pawl-and-ratchet connection with the front axle; Fig. 7 is a detail showing in plan the chain and shifting dog for raising the plows; Fig. 8 is a sectional detail showing the engagement of one of the shifting dogs with the levers in raising the plows; Fig. 9 is a similar sectional view showing the engagement of the other shifting dog with the levers in lowering the plows; Figs. 10 and 11 are details showing in perspective the raising and lowering shifting dogs; Fig. 12 is a detail showing the connection between the plow and the plow-beam.
The frame $a$ is supported at its front by the axle $b$ upon each end of which is mounted loose a wheel $c$ which carries a pawl $d$ controlled by the spring $e$ and adapted to engage the teeth of a ratchet $f$, when the plow moves to the front. However, when the plow moves to the rear, the pawl slips over the teeth of the ratchet; and as the ratchet is fast upon the end of the axle, it follows that the axle will be turned only when the plow is moved to the front. The rear of the frame is supported upon the wheel $c'$ which is mounted in a hanger $h$ the free end of which is bent to form a post $i$ mounted to swivel in the bracket $j$ secured to the frame. The wheels $c$, $c'$ run on unplowed ground, thereby tending to keep the frame level.

The diagonal beam $k$ forming the rear portion of the frame $a$ carries the brackets $m$, $m'$, the number of each of which equals the number of plows $n$ in the gang. The plow-beam $o$ of each plow is bifurcated at its front end, the lower arm $p$ being pivotally mounted in one of the brackets $m$ which extends below and in front of the beam $k$, while the upper arm $q$ is connected by a link-rod $r$ with one end of a bent or elbow lever $s$ the other end of which is free. Each lever $s$ is fulcrumed upon a post $t$ which projects rearwardly from the front beam $a'$ of the frame $a$. To each plow $n$ is secured the rear end of a diagonal brace $u$ the front end of which is pivotally secured in one of the brackets $m'$. From each of the side-beams $a''$ of the frame project downwardly and to the front a hanger $v'$; and mounted free to oscillate in these hangers $v'$ is a draw-beam $v$ the apex of which is provided with a hook by means of which the draw-beam is connected to the engine (not shown) by which the gang plow is hauled to the front. Between the draw-beam $v$ and each bracket $m$ is interposed a draft-rod $x$ the front end of which is pivotally secured to the draw-beam $v$ in line with the pivots $v''$ of the latter (Fig. 1), while the rear end of the draft-rod $x$ is pivotally secured in one of the brackets $m$ (Fig. 2). By this arrangement the stress of the pull necessary to draw the plow forward is transmitted to the several plows without the intervention of the frame $a$, from which it results that the frame may be made much lighter in construction.

It will be obvious from an inspection of Figs. 1, 2 and 3 that if the free end of one of the levers $s$ be thrown to the right in Figs. 1 and 3, the plow $n$ connected to said lever will be raised, the plow-beam rotating in the bracket m in which its lower arm p is pivotally secured (Fig. 2.) To throw the free end of the bent lever s so as to raise the plow n which it controls, the following mechanism is provided: Upon the axle b is mounted fast near its central portion a bevel gear 2 which meshes with a bevel gear 3 (Fig. 3) mounted upon the shaft 4 journaled in the front of the frame a. Upon its front end the shaft 4 carries a loose sprocket wheel 5 the hub of which is formed with teeth 6 adapted to engage a clutch 7 mounted free to slide upon but rotatable with the shaft 4. To the front face of the front beam a' is secured a bracket 8 in which rotates the front end of the shaft 4 around which is coiled a spring 9 one end of which bears against the front or bearing part of the bracket 8, while the other end bears against the front part of the clutch 7. The latter is formed with a circumferential groove in which is mounted the forked end 12 of a bent or elbow lever 13 fulcrumed at 14 upon the bracket 8. The other end of the lever 13 is provided with an eye 15 in which engages the rear end of the operating lever 17.

From the front beam a' projects forwardly a top-plate 19 near one end of which is secured a bracket 19× in which is mounted the swinging catch 20 connected by the link-rod 21 with the operating lever 17. The free end of the catch 20 swings over the guideway or channel 22 formed in the front edge of the top-plate 19. At each end of the latter is rotatably mounted in hangers 25 a sprocket-idler 24; and around the loose sprocket drive-wheel 5 and the sprocket idlers 24 passes an endless sprocket-chain 26 which carries the shifting-dogs 23 and 27, (Figs. 10 and 11). The shifting-dog 23 is hook-shaped at its free end and is adapted and designed to engage the downwardly-projecting lip s' formed on the arm s× of the elbow levers s, and thereby to move each lever s so as to raise the plow n connected therewith. The free end s'' of each elbow lever s arches up from and lies in a plane higher than the plane of the part ×, as is best shown in Figs. 2 and 4.

Mounted upon the V-shaped draw-beam v are two posts 11 connected by the locking-bar 16 formed with notches 16× in which is adapted and designed to engage the tongue 18 which projects downwardly from the free end of the operating lever 17. The leaf-spring 17× serves to hold the operating lever 18 close down upon the locking-bar 16 so that the tongue 18 will drop into one of the notches 11, when one of the latter registers with the tongue 18, thereby locking the lever 17 in place.

As the gang plow approaches the end of the field, the operator throws the lever 17 to the left in Figs. 1 and 3, whereupon the clutch 7 engages the hub of the loose sprocket drive-wheel and the free end of the catch 20 is drawn away from the guideway 22, thereby allowing to pass the free hook-shaped end of the shifting dog 23, which projects from the guideway 22. After the free end of the dog 23 has passed the free end of the catch 20, the operating lever is moved to the right in Figs. 1 and 3, until the tongue 18 engages in the central notch 16× in the locking-bar 16. By this movement of the operating lever 17, the free end of the catch 20 is interposed in the path of travel of the tooth 31 on the shifting dog 27. The chain 26 is now driven by the interlocked clutch and sprocket wheel; and the shifting dog 23 in its travel engages successively the lip s' of each lever s and throws the latter successively into the dotted line position of Fig. 3. In moving to the right in Fig. 3, the lip s' of each lever s rides up one of the inclined blocks or cam-lugs 28 formed upon the top plate 19. As the lever s rises at its free end, the shifting-dog 23 passes under the portion s'' and out of engagement with the lever s. The latter is then forced down upon the top plate 19 by the leaf spring 29 and is held against reverse movement by the straight vertical side of the block 28. As the shifting-dog 23 passes down over the sprocket-idler on the right of Figs. 1 and 3, the shifting-dog 27 comes up over the sprocket-idler 24 on the left and travels to the right, its tooth 31 engaging the free end of the catch 20 and forcing it to the right. This movement of the catch 20 results in swinging the inner end of the operating lever 17 to the left in Figs. 1 and 3 upon the tongue 18 as a fulcrum and in throwing the clutch 7 out of engagement with the sprocket drive-wheel 5. Thus, the movement of the chain is stopped. To lower the plows n, the operating lever is now disengaged from the central notch 16× of the locking-bar 16 and its free outer end is thrown to the left in Figs. 1 and 3, thereby removing the free end of the catch 20 from the path of the tooth 31 of the shifting-dog 27. At the same time the clutch 7 is thrown into engagement with sprocket drive-wheel 5 and the dog 27 starts on its travel to the right, during which movement its cam or inclined face 30 rubs against the lip s' of each elbow lever s in succession and raises the lip s' out of engagement with the block or cam-lug 28, thereby permitting the plow n to fall by gravity. Immediately after the shifting-dog 27 has passed the free end of the catch 20, the operating lever 17 is thrown to its central position and its tongue 18 engages the central notch 16× in the locking bar 16. As the shifting-dog 27 passes down over the sprocket-idler 24 on the right, the shifting-dog 23 comes up over the sprocket-idler 24 on the left and moves along to the right, its hook end engaging the free end of the catch 20 and forcing it to the right. This movement of the catch 20 results as before in disengaging the clutch 7 from the drive-wheel 5.

The plows being all down or lowered, in order to raise some of them, the operator throws the lever 17 to the left in Figs. 1 and 3, thereby interlocking the clutch 7 with the sprocket drive-wheel 5 and removing at the same time the free end of the catch 20 from the path of the shifting-dog 23. The latter now travels to the right, raising the plows in succession; and after the desired number of plows have been raised, the operator throws the lever 17 completely over to the right, thereby disengaging the clutch 7 from the sprocket drive-wheel 5. To lower any number of plows, the operator throws the free end of the lever 17 over to the left in Figs. 1 and 3, thereby setting the chain 26 in motion and permitting the shifting-dog 27 to pass to the right. After the latter has lowered the desired number of plows, the operator throws the free end of the lever 17 over to the right, thereby bringing the chain 26 to a standstill.

The plow standard 32 is forked at its upper end and through the arm 33 of the fork passes a bolt 34 which passes also through the rear end of the brace $u$ and the rear end of the plow-beam $o$, the upper end of the arm lying between the brace $u$ and the plow-beam $o$. The bolt 34 serves as a pivot upon which the plow $n$ may be swung. The other arm 35 of the fork extends between two bolts 37 which pass through the brace $u$ and the plow-beam $o$ and is held by tightening the nuts 38 on the bolts 37. The arm 35 may be held with sufficient frictional resistance to overcome any tendency of the plow $n$ to swing under the stress of its ordinary work. But should the plow $n$ strike a stump, large rock or other obstacle of a like nature, the plow $n$ will swing upon the pivotal bolt 34, thereby avoiding breakage of the parts. Moreover, should the plow need repair, the nuts 38 may be loosened and the plow may be swung to the rear to expose the parts and render them accessible to the workman.

We are aware of the patent granted W. Gregory, May 1, 1906, No. 819,423; but in the plow shown in that patent the grooved disks 39 are not operable independently of one another but depend for their operation upon the operation of the preceding short shaft-section 31. In our new plow any lever $s$ may be thrown independently of the others and, therefore, any number of plows may be used. The dog 27 will travel under the bent portion $s''$ of the thrown levers without engaging the same and yet will engage every lever $s$ which is not thrown and the plow attached to which is lowered and in operation. Further, in the plow shown and described in the said patent each grooved disk 39 is operated by its own short shaft-section 31 and the dogs 40 mounted thereon, while in our plow a single dog 27 travels past and operates each lever $s$ in succession, all the levers projecting into the path of travel of this device 27. Further, in our plow no reversal of the chain is necessary to raise and lower the plows; for, both these operations of raising and lowering are performed by the chain while moving in the same direction.

We claim:

1. In a gang plow, the combination of a plurality of plows; a frame in which said plows are mounted free to swing; a plurality of levers connected each with one of said plows; an endless chain mounted in said frame; mechanism for driving said endless chain; and a device carried by said chain and adapted to swing each of said levers successively.

2. In a gang plow, the combination of a plurality of plows; a frame in which said plows are mounted free to swing; a lever for and connected with each of said plows; a mechanically-operated device which engages and then moves past each of said levers in succession for shifting each of said levers successively to swing said plows; and means for moving said device.

3. In a gang plow, the combination of a plurality of plows; a frame in which said plows are mounted free to swing; a lever for and connected with each of said plows; a mechanically-operated device which engages and then moves past each of said levers in succession for shifting each of said levers successively to swing said plows; and means for throwing said levers out of engagement with said device.

4. In a gang plow, the combination of a plurality of plows; a frame in which said plows are mounted free to swing; a lever for and connected with each of said plows; a mechanically-operated device which engages and then moves past each of said levers successively for shifting each of said levers successively to swing said plows; and means for locking said levers in their thrown position.

5. In a gang plow, the combination of a plurality of plows; a frame in which said plows are mounted free to swing; a lever for and connected with each of said plows; means for throwing each of said levers in succession; and a cam-lug formed with an incline for each of said levers, said cam-lug raising one arm of the lever out of engagement with said means.

6. In a gang plow, the combination of a plurality of plows; a frame in which said plows are mounted free to swing; a lever for and connected with each of said plows; a cam-lug for each lever, said cam-lugs being formed with an incline; and a yielding device for each of said levers said device forcing said lever into engagement with said cam-lug.

7. In a gang plow, the combination of a plurality of plows; a frame in which said plows are mounted free to swing; means for swinging said plows; and mechanism for actuating said means successively, said mechanism consisting of an axle upon which said frame is mounted; a shaft driven by said axle; a sprocket-wheel loose upon said shaft; a chain engaged and driven by said sprocket-wheel; a device carried by said chain and adapted to engage said plow-swinging means successively; and a clutch fast upon said shaft and adapted to be thrown into and out of engagement with said sprocket-wheel.

8. In a gang-plow, the combination of a supporting frame; a plurality of levers mounted in said frame free to be swung independently one of the other; a plurality of plows mounted free to swing in said frame and connected one to each of said levers; and a mechanically operated device which engages and moves past and thereby turns said levers successively to swing to said plows.

9. In a gang plow, the combination of a supporting frame; a plurality of plows mounted free to swing in said frame; and mechanism for swinging said plows in succession, said mechanism consisting of a plurality of levers, one connected to each of said plows; a chain; a device carried by said chain, one arm of each of said levers being normally interposed in the path of said device; and means for driving said chain.

10. In a gang plow, the combination of a supporting frame; a plurality of plows mounted free to swing in said frame; and mechanism for swinging said plows in succession; said mechanism consisting of a plurality of levers, one connected to each of said plows and operable each independently of the other; a chain; a device carried by said chain, one arm of each of said levers being normally interposed in the path of said device; and means for driving said chain.

11. In a gang plow, the combination with a frame and a plurality of plows mounted therein free to swing, of a plurality of rotary devices, each of which is connected with one of said plows for swinging the same; a device which engages and then moves past successively each of said rotary devices and into the path of travel of which each of said rotary devices projects to be engaged thereby in succession; and mechanically-operated means for moving said device into engagement successively with said rotary devices.

12. In a gang plow, the combination with a frame and a plurality of plows mounted therein free to swing, of a plurality of rotary devices, each of which is connected with one of said plows for swinging the same; a device which engages and then moves past successively each of said rotary devices and into the path of travel of which each of said rotary devices projects to be engaged thereby in succession; mechanically-operated means for moving said device into engagement successively with each of said rotary devices; and means for releasing said device successively from engagement with said rotary devices.

13. In a gang plow, the combination with a frame and a plurality of plows mounted therein free to swing, of a plurality of rotary devices, each of which is connected with one of said plows for swinging the same; a device which engages and then moves past successively each of said rotary devices and into the path of travel of which each of said rotary devices projects to be engaged thereby in succession; mechanically-operated means for moving said device into engagement successively with said rotary devices; and means for locking said rotary devices against return movement after they have been shifted by said device.

14. In a gang plow, the combination with a frame and a plurality of plows mounted therein free to swing, of a plurality of rotary devices, each of which is connected with one of said plows for swinging the same and each of which is operable to swing its attached plow independently of the others; means for locking said rotary devices with the plows raised; and a mechanically-operated device which engages and then moves past each of said rotary devices successively for releasing the same in succession to permit the plows to fall by gravity.

15. In a gang plow, the combination with a frame and a plurality of plows mounted therein free to swing, of devices for raising said plows from the ground; a shifting dog; an endless carrier for said dog, said carrier causing said dog to engage said devices in succession; and means for driving said carrier.

16. In a gang plow, the combination with a frame and a plurality of plows mounted therein free to swing, of devices for locking said plows in raised position; a shifting dog; an endless carrier for said dog; and means for driving said carrier; said dog releasing said plows from said devices and thereby permitting said plows to fall by gravity.

17. In a plow, the combination of a plurality of plows; a frame in which said plows are mounted free to swing independently each of the other; a plurality of plow-swinging mechanisms for swinging said plows, there being one of said mechanisms for each of said plows and said mechanisms being independent each of the other; a device which engages and actuates successively said mechanisms to cause the latter to swing said plows one by one; driving mechanism for bringing said device into actuating engagement with each of said plow-swinging mechanisms successively; and means controlled by said device for automatically throwing said driving mechanism out of operation.

In testimony whereof we have hereunto set our hands at Osage, Iowa this 26th day of June, A. D., 1907, in the presence of the undersigned witnesses.

FRANK A. FALK.
HENRY C. ANDERSON.

Witnesses:
　FRED. G. FISK,
　A. A. KUGLER.